United States Patent [19]
Ganiaris

[11] 3,908,033
[45]*Sept. 23, 1975

[54] PREPARATION OF SOLUBLE COFFEE

[75] Inventor: Neophytos Ganiaris, Riverdale, N.Y.

[73] Assignee: Struthers Scientific and International Corporation, New York, N.Y.

[ * ] Notice: The portion of the term of this patent subsequent to May 7, 1991, has been disclaimed.

[22] Filed: Jan. 2, 1973

[21] Appl. No.: 320,595

Related U.S. Application Data

[63] Continuation-in-part of Ser. No. 273,258, July 19, 1972, Pat. No. 3,809,775.

[30] Foreign Application Priority Data

Jan. 5, 1972   United Kingdom.................. 361/72

[52] U.S. Cl. ................ 426/427; 426/388; 426/432; 426/472; 426/489
[51] Int. Cl............................ A23f 1/10; A23f 1/04
[58] Field of Search .......... 426/388, 428, 427, 475, 426/444, 495, 472, 432, 434, 490, 489

[56] References Cited
UNITED STATES PATENTS

| | | | |
|---|---|---|---|
| 3,087,822 | 4/1963 | Smith.................................. | 426/475 |
| 3,381,302 | 4/1968 | Reimus............................... | 426/495 |
| 3,809,775 | 5/1974 | Ganiaris............................. | 426/427 |

OTHER PUBLICATIONS

Sivetz, *Coffee Processing Technology*, Vol. II, 1963, pages 208–213.

Sivetz, *Coffee Processing Technology*, Vol. I, 1963, pages 267–268.

"Formation of Carcinogenic Hydrocarbons During Thermal Treatment of Foods," Chem. Abstracts, Vol. 71, 1969, 2301 P, page 208.

*Primary Examiner*—Frank W. Lutter
*Assistant Examiner*—N. Greenblum
*Attorney, Agent, or Firm*—William Anthony Drucker

[57] ABSTRACT

The invention includes a method and apparatus for producing soluble coffee extract which comprises extraction and separation of caffeine from the green coffee beans followed successively by roasting of the beans, extraction with water, removal of carcinogens and addition of caffeine.

10 Claims, 1 Drawing Figure

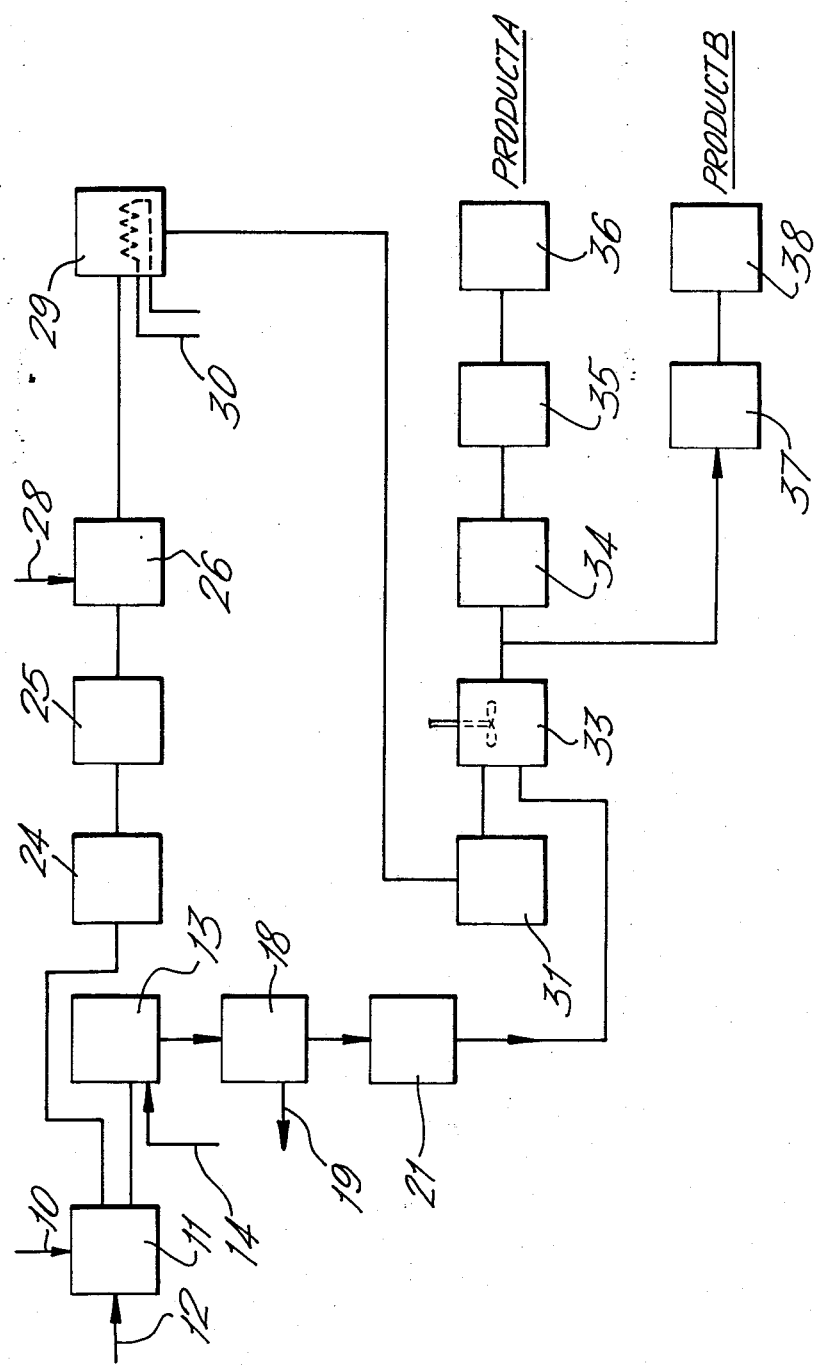

PREPARATION OF SOLUBLE COFFEE

This application is a continuation in part of application Ser. No. 273,258 filed July 19, 1972 now U.S. Pat. 3,809,775 issued May 7, 1974.

This invention relates to the production of soluble coffee extract.

It is known that compounds such benzopyrenes and benzofluoranthene are proven carcinogens. Such compounds are formed during roasting of the coffee beans and are insoluble in water.

However, the carcinogens were found in coffee extract. It appears that the presence of caffeine affects the solubility of benzopyrenes and benzofluoranthene in water. Therefore, the following process is proposed for eliminating the carcinogens.

1. Extraction and separation of caffeine from the green coffee beans.
2. Roasting of the beans.
3. Extraction with water.
4. Removal of carcinogens
5. Addition of caffeine.
6. The extractment then be dried.

Since the caffeine has been removed, any carcinogens (benzopyrenes, etc.) formed during roasting will not dissolve in the water during extractions. Such compounds might appear in the form of a colloidal suspension in the coffee extract. By cooling the extract and keeping it at a low temperature for a period of 1 to 10 hours, the benzopyrenes etc. will coagulate and precipitate out together with other polymeric substances insoluble in water at this temperature. Subsequently, the precipitate is separated from the extract by centrifugation or filtration.

Caffeine is added back to the clarified extract, and then drying of the extract is accomplished by spraying or freezing techniques.

Caffeine may be extracted from the green coffee beans with hot water from which caffeine is extracted by a solvent e.g. trichlorethylene and the solvent is removed by evaporation. The aqueous extraction may be carried out in a batch counter current system or by a series connected percolators.

The decaffeinated beans are then dried and roasted and subjected to extraction under heat and pressure in a batch of extractors.

The liquid extract may contain at least 10 per cent by weight coffee solids e.g. 10 to 20 or 10 to 30 per cent. This liquid is then treated to remove carcinogens. Since the caffeine has been removed, any carcinogens (e.g. benzopyrenes) formed during roasting will not dissolve in the water during extraction. Such compounds may precipitate or may appear in the form of a colloidal suspension in the coffee extract. The removal of carcinogens may be effected by cooling the extract below 400°F e.g. 27° to 40°F preferably 30° to 35°F and holding it at this temperature for a period of one to ten hours e.g. 2 to 6 hours during which time the carcinogens will coagulate and separate out together with other substances insoluble in water at this temperature. The precipitate is separted from the extract by centrifugation e.g. in a perforated basket type centrifugal separator or by filtration.

Caffeine is then added to the liquid extract either by addition of caffeine in solid form, or in aqueous solution.

The total quantity of caffeine removed by extraction may be returned to the liquid extract or any less proportion. The caffeine may be added continuously or batchwise and the extract may be suitable stirred or otherwise agitated to ensure effective mixing.

The liquid extract may then be dried e.g. by spray drying or by freeze concentration followed by freeze drying i.e. sublimation at low pressures.

The invention is illustrated by way of example with reference to the flow diagram shown in the accompanying drawing.

Green coffee beeans are fed at 10 to an extractor 11 into which also hot water is fed at 12. The hot water containing caffeine passes from 11 to a vessel 13 into which trichlorethylene is introduced at 14. The caffeine solution is passed on to an evaporation vessel 18 and trichlorethylene is taken out at 19 and recovered. The caffeine passes into a container 21.

The decaffeinated green beans are conveyed to a drying chamber 24 and from there to a roasting chamber 25. The beans are then transferred to an extraction plant 26 where the coffee is extracted in water under heat and pressure. A water inlet is shown at 28. The liquid coffee extract then enters a holding tank (or series of tanks) 29 having cooling means 30 supplied with cold brine. The liquid is then treated in a centrifuge 31 to remove precipitated material and the liquid is conveyed to a mixing tank 33 into which caffeine from container 21 is discharged. The liquid then passes either to a spray dryer 37 for producing spray dried coffee (product B) or to a freeze concentrator 34 and freeze dryer 35 for producing freeze dried coffee (product A). The freeze dried coffee is storaged in vessel 36 and the spray dried coffee in vessel 38.

What I claim is:

1. A method of producing soluble coffee extract which comprises extraction and separation of caffeine from green coffee beans by a solvent, separating the solvent from the caffeine, roasting the decaffeinated coffee beans, extracting the roasted coffee with water under heat and pressure, holding the liquid extract of coffee for 1 to 10 hours at below 40°F to precipitate benzopyrenes and benzofluoranthanes, centrifuging or filtering the liquid extract to remove the precipitate, feeding the liquid coffee extract from the centrifuge to a mixing tank, feeding the caffeine to said mixing tank, mixing said caffeine with said liquid coffee extract in said mixing tank and thereafter drying the liquid extract.

2. A method as claimed in claim 1 wherein said extraction of the roasted beans in water is effected under a pressure greater than atmospheric pressure and the liquid extract is held at a low temperature for a period of 1 to 10 hours to form a precipitate, and the precipitate is then removed by either centrifugation or filtration.

3. A method as claimed in claim 2 wherein the low temperature is 27° to 40°F.

4. A method as claimed in claim 2 wherein the low temperature is 30° to 35°F.

5. A method as claimed in claim 2 wherein the liquid after addition of the caffeine is dried by spray drying or freeze concentration, followed by freeze drying.

6. A method as claimed in claim 1 wherein the low temperature is 27° to 40°F.

7. A method as claimed in claim 6 wherein the liquid after addition of the caffeine is dried by spray drying or freeze concentration, followed by freeze drying.

8. A method as claimed in claim 1 wherein the low temperature is 30° to 35°F.

9. The method as claimed in claim 8 wherein the liquid after addition of the caffeine is dried by spray drying or freeze concentration, followed by freeze drying.

10. A method as claimed in claim 1 wherein the liquid after addition of the caffeine is dried by spray drying or freeze concentration, followed by freeze drying.

* * * * *